No. 643,027. Patented Feb. 6, 1900.
J. P. ABERNATHY.
COLTER.
(Application filed June 19, 1899.)
(No Model.)

Witnesses
F. L. Ourand.
Esther V. Byng.

Inventor:
John P. Abernathy,
Louis Bagger & Co.,
Attorneys.

THE NORRIS PETERS CO., PHOTO-LITHO., WASHINGTON, D. C.

UNITED STATES PATENT OFFICE.

JOHN P. ABERNATHY, OF JONESBOROUGH, ARKANSAS.

COLTER.

SPECIFICATION forming part of Letters Patent No. 643,027, dated February 6, 1900.

Application filed June 19, 1899. Serial No. 721,118. (No model.)

*To all whom it may concern:*

Be it known that I, JOHN P. ABERNATHY, a citizen of the United States, residing at Jonesborough, in the county of Craighead and State of Arkansas, have invented new and useful Improvements in Colters, of which the following is a specification.

My invention relates to colters or cutters for plows which are connected with the beam in front of the share, so as to make an incision in the ground in advance thereof.

The object of the invention is to provide an improved construction of the same which can be applied to the ordinary plow now in use and can be connected with the beam centrally thereof or at either side, as may be found convenient or desirable.

The invention consists, essentially, in the combination, with a plow-beam, of the inclined colter formed with a series of holes near the rear edge and the clip consisting of a metal rod having the ends bent at right angles and screw-threaded, the plates through which said ends pass, and one of said ends also passing through one of the holes in said colter, and the nuts engaging with said ends of the clips, as hereinafter fully described and claimed.

Figure 1:
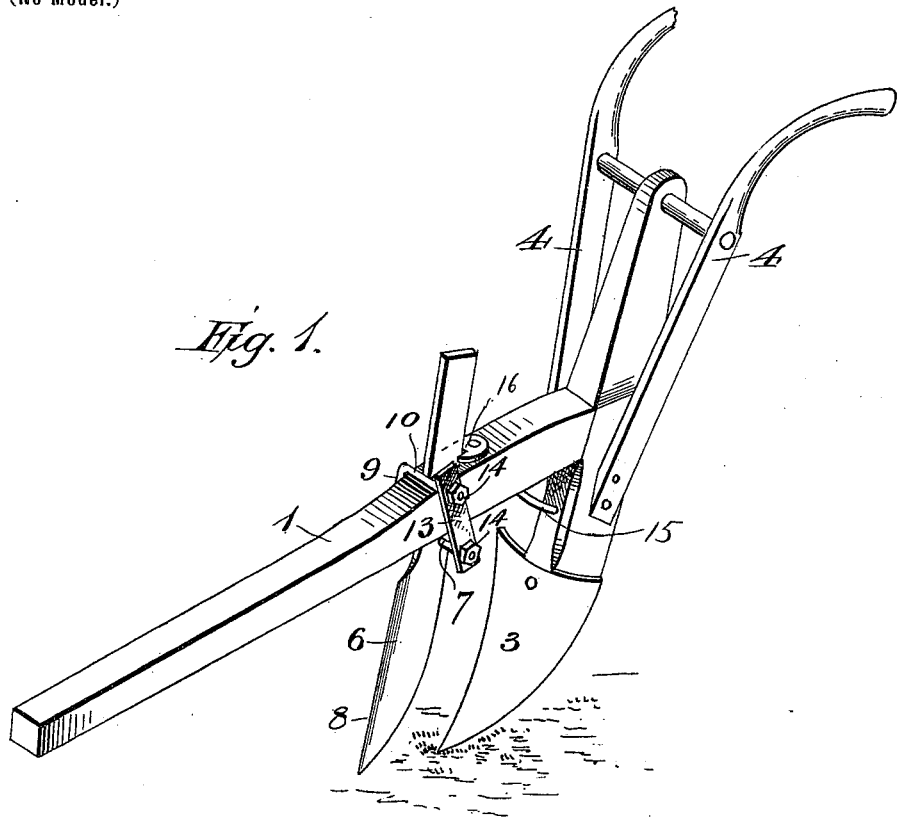
Figure 2:
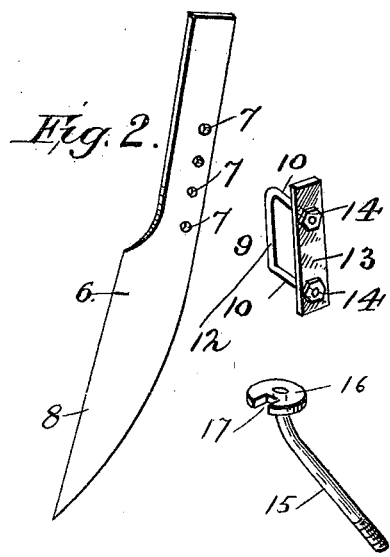
Figure 3:
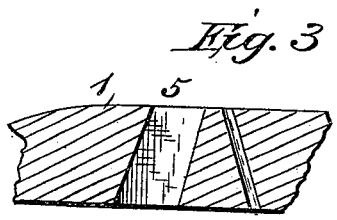

In the accompanying drawings, Figure 1 is a perspective view of a plow provided with my improved colter or cutter. Fig. 2 is a similar view of the colter and clip detached from the beam. Fig. 3 is a detail longitudinal section of the beam, showing the inclined slot therein.

In the said drawings the reference-numeral 1 designates the beam, 2 the sheth, 3 the share, and 4 the handles, of a plow of any ordinary or suitable construction. The said beam near the inner end is formed with an inclined slot 5, through which the shank of the colter 6 passes. This shank is formed with a number of holes 7, and at the lower end is formed with a cutting edge 8.

The numeral 9 designates a clip consisting of a metal rod having the ends bent inwardly at right angles, forming two lateral arms 10, which are adapted to engage with the upper and lower sides of the beam, while the intermediate portion 12 abuts against one of the sides of the beam. The ends of the arms 10 are screw-threaded and pass through holes in a bar 13, which is held in place by nuts 14.

Instead of the beam being slotted and the colter passing therethrough the latter may be secured to either side of the beam by being clamped between the same and the portion 12 of the clip.

As will be seen, the lower arm 10 of the clip passes through one of the holes in the colter, whereby the latter is held securely in place.

The numeral 15 designates a curved brace-bar, one end of which passes through the sheth or standard and is screw-threaded to receive a securing-nut. The other end of this bar passes through the beam and is provided with a circular head 16, formed with a notch 17, which engages with the rear edge of the colter.

The operation will be readily understood. The colter will travel in advance of the share and make an incision in the ground, and being adjustable the depth of the incision can be regulated. A roller-cutter may also be secured to the shank of the colter instead of having the same formed with a cutting edge, if desired.

Having thus fully described my invention, what I claim is—

1. In a plow, the combination with the beam formed with an inclined slot, and the colter passing therethrough provided with a series of holes, of the clip comprising the metal rods having their ends bent at right angles and screw-threaded and one of said ends engaging with one of the edges of the colter while the other passes through one of the holes in the colter, and the inclined plate through which said ends pass, and the securing-nuts, substantially as described.

2. In a plow, the combination with the beam provided with an inclined slot, the colter passing therethrough formed with a series of holes, and the clip comprising the rod having its ends bent at right angles embracing the beam, the plate and the nuts, of the standard, the brace-bar connected therewith, and the head formed with a slot engaging with the rear edge of the colter, substantially as described.

In testimony whereof I have hereunto set my hand in presence of two subscribing witnesses.

JOHN P. ABERNATHY.

Witnesses:
ALLEN HUGHES,
J. M. JOHNSON.